(12) United States Patent
Kondo

(10) Patent No.: US 6,862,115 B1
(45) Date of Patent: Mar. 1, 2005

(54) IMAGE READING APPARATUS AND AN IMAGE PROCESSING SYSTEM HAVING A DIRT TRAPPING DEVICE

(75) Inventor: Hirotaka Kondo, Isehara (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/480,162

(22) Filed: Jan. 10, 2000

(30) Foreign Application Priority Data

Jan. 13, 1999 (JP) .......................................... 11-006486

(51) Int. Cl.$^7$ .............................................. H04N 1/04
(52) U.S. Cl. ........................ 358/474; 358/487; 358/472
(58) Field of Search ................................ 358/463, 471, 358/474; 355/30; 235/375; 271/3.14, 8.1; 250/223 R (56) References Cited

U.S. PATENT DOCUMENTS

| | | | | |
|---|---|---|---|---|
| 4,001,838 A | * | 1/1977 | Maddox | 347/155 |
| 4,148,076 A | * | 4/1979 | Costello et al. | 358/472 |
| 5,673,125 A | * | 9/1997 | Merecki et al. | 358/487 |
| 5,692,842 A | * | 12/1997 | Sasai et al. | 400/59 |
| 5,844,697 A | * | 12/1998 | Omvik et al. | 358/487 |

FOREIGN PATENT DOCUMENTS

| | | |
|---|---|---|
| JP | 9-27889 | 1/1997 |
| JP | 9-55828 | 2/1997 |
| JP | 9-65050 | 3/1997 |

* cited by examiner

*Primary Examiner*—Edward Coles
*Assistant Examiner*—Heather D. Gibbs
(74) *Attorney, Agent, or Firm*—Oblon, Spivak, McClelland, Maier & Neustadt, P.C.

(57) ABSTRACT

An image reading apparatus includes a sheet guide path and reads an image on a sheet. The image reading apparatus includes a sheet transporting device configured to transport the sheet along the sheet guide path and an image reading device configured to optically read the image on the sheet. Further, the image reading apparatus includes a dirt trapping device configured to trap dirt carried on the sheet. The dirt tapping device is disposed at a position upstream from the image reading device relative to a direction in which the sheet is transported by the sheet transporting device.

28 Claims, 10 Drawing Sheets

IMAGE READING APPARATUS AND AN IMAGE PROCESSING SYSTEM HAVING A DIRT TRAPPING DEVICE

BACKGROUND OF THE INVENTION

1. Field of the Invention

The present invention relates to an image reading apparatus having a sheet guide path and an image processing system using the same. More particularly, the present invention relates to an image reading apparatus having a sheet guide path used as an image input device for a computer system for example. Further, the present invention relates to an image processing system using a sheet guide path, such as a photocopier, a facsimile machine, an image filing system, or a multifunctional image processing apparatus having functions such as a photocopier function, a facsimile function, etc.

2. Discussion of the Background

Figure 1:
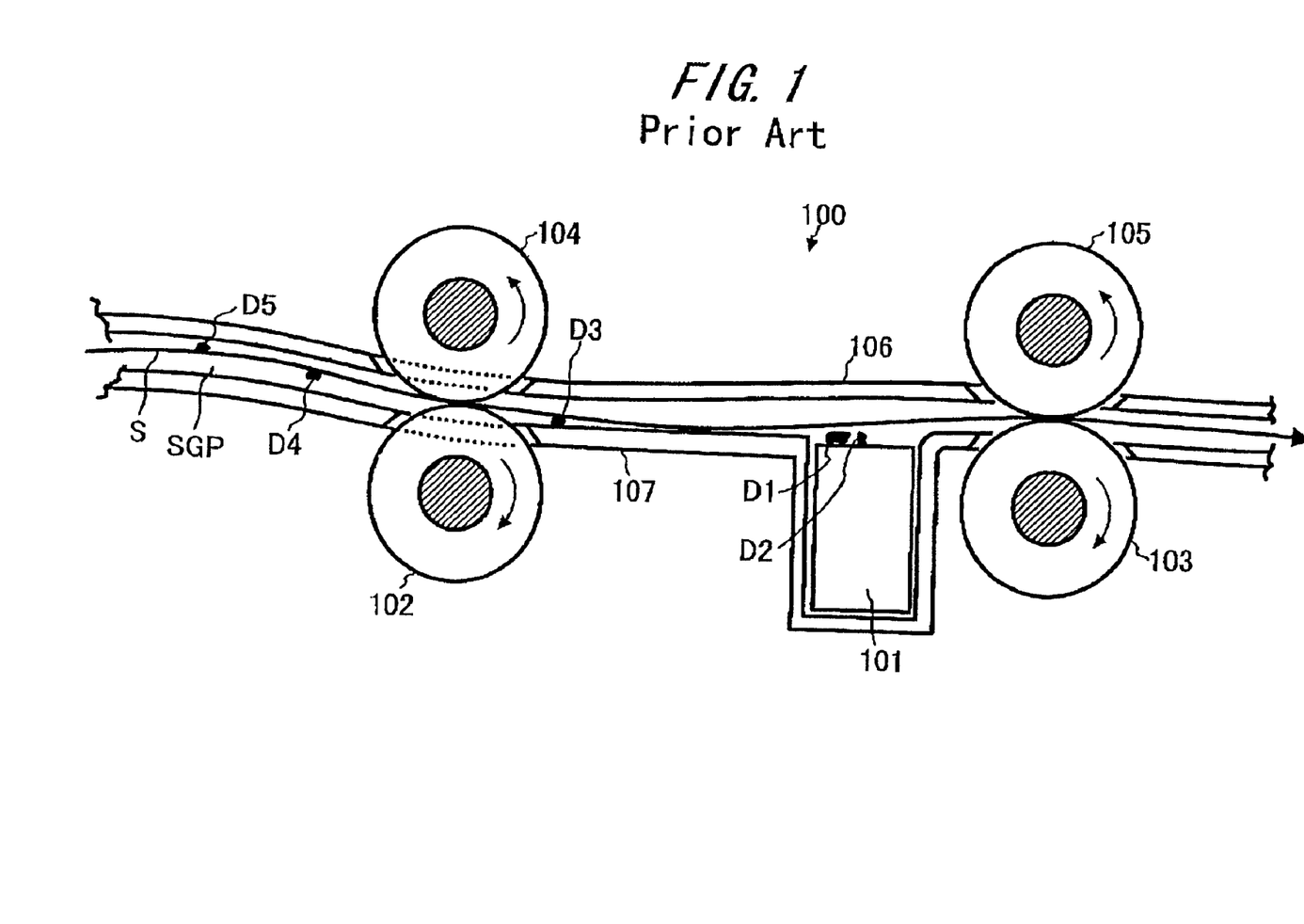
FIG. 1 is a schematic sectional view illustrating a conventional image reading apparatus.

FIG. 1 is a schematic sectional view illustrating a conventional image reading apparatus 100. Referring to FIG. 1, de image reading apparatus 100 includes an optical image reading deuce 101, a sheet transport roller 102, a sheet discharge roller 103, a first pinch roller 104 opposing the sheet transport roller 102, a second pinch roller 105 opposing the sheet discharge roller 103, an upper sheet guide 106, and a lower sheet guide 107. Together with the upper sheet guide 106, the lower sheet guide 107 forms a sheet guide path denoted as "SGP," which is a space between the sheet guides 106 and 107.

The sheet transport roller 102 and the sheet discharge roller 103 rotate in a clockwise direction. The first pinch roller 104 is pressed toward the sheet transport roller 102 with an appropriate pressure, and the second pinch roller 105 is pressed toward the sheet discharge roller 103 with an appropriate pressure. When no sheet is being fed, the first pinch roller 104 contacts the sheet transport roller 102, and the second pinch roller 105 contacts the sheet discharge roller 103. The first and second pinch rollers 104 and 105 rotate in a counter clockwise direction. When a sheet, S, is fed into the left side of the sheet guide path SGP in FIG. 1, the first pinch roller 104 presses the sheet S against the sheet transport roller 102, and the second pinch roller 105 presses the sheet S against the sheet discharge roller 103. Thus, the sheet of document S is transported along the sheet guide path SGP from the left side toward the right side of e sheet guide path SGP by the sheet transport roller 102 and the sheet discharge roller 103.

When the sheet S is transported over the optical image reading device 101, image information carried on a surface of the sheet, which is facing the optical image reading device 101, is read by the optical image reading device 101. Then, the sheet S is discharged from the image reading apparatus 100 by the sheet discharge roller 103.

Sometimes sheets carry dirt, dust or other particles or detritus such as fibers of paper, which have been rubbed off the surface of the sheet due to a rubbing motion between two sheets of a document Fibers of paper are also generated by a rubbing motion between a sheet of a document and a separating roller of a separating mechanism when the sheet is separated from the other sheets of the document. Sheets also carry other types of dirt or particles, such as particles of pencil lead, particles of an eraser, particles of ink, particles of photocopier toner, lint, etc. Referring back to FIG. 1, particles of dirt D3, D4, and D5 are adhered to the sheet S, and particles of dirt D1 and D2 are particles that have dropped off front sheets of a document and have piled up on the optical image reading device 101. As used herein, the term "dirt" includes any dust detritus, or other particles carried on sheets of paper that pass through the sheet guide path. When the optical image reading device 101 becomes soiled by dirt, the optical image reading device 101 may erroneously read information on the sheet S.

Japanese Laid-Open Patent Publication No. 09027889 describes a document reader that has two pairs of sheet carrying rollers, a backup roller, and a platen glass. The platen glass is further downwardly placed opposing the backup roller kept with a gap of 1 mm or over to avoid adhesion of dust on the platen glass. However, Japanese Laid-Open Patent Publication No. 09027889 does not disclose a device that prevents dirt on a sheet from reaching a reading portion, including the platen glass.

Japanese Laid-Open Patent Publication No. 09055828 describes an image reader mechanism that has a contact image sensor (CIS), a CIS roller, a cam, a spring presser, a motor, and a control unit. The control unit monitors an output signal waveform of the CIS. When the output signal waveform of the CIS is lowered, the control unit determines that a glass surface of the CIS is stained. Then, the control unit activates the motor and the cam such that the spring presser presses the CIS against the CIS roller to clean the glass surface of the CLS. However, Japanese Laid-Open Patent Publication No. 09055828 does not describe a device that prevents dirt on a sheet from reaching the glass surface of the CIS.

Japanese Laid-Open Patent Publication No. 09065050 describes an original document reader that has a contact type image sensor, a roller shaped white elastic fiction body, and washing pads. When the contact type image sensor senses whether the roller sped white elastic friction body or the contact type image sensor is blackened, the washing pads are applied with detergent and then put into contact with the roller shed white elastic friction body to remove dirt on the surfaces of the roller shaped white elastic friction body and the contact type image sensor. However, Japanese Laid-Open Patent Publication No. 09065050 does not describe a device to prevent dirt on a sheet of document reaches at the roller shaped white elastic friction body and the contact type image sensor.

In the above described apparatuses, sheets can still carry dirt to image reading portions of the apparatuses. Therefore, it is likely that the image reading portions of those apparatuses will be soiled during normal operation.

SUMMARY OF THE INVENTION

Accordingly, one object of the present invention is to provide a novel image reading apparatus having an image reading portion that does not become soiled with dirt.

Another object of the present invention is to provide a novel image reading apparatus that can stably perform image reading operations for a relatively long time.

The novel image reading apparatus of the present invention includes a sheet transporting device configured to transport a sheet along the sheet guide path. The image reading apparatus also includes an image reading device configured to optically read an image on the sheet of document. Further, the image reading apparatus includes a dirt trapping device configured to trap dirt carried on the sheet. The dirt trapping device is disposed at a position upstream from the image reading device relative to the direction that the sheet is transported.

BRIEF DESCRIPTION OF THE DRAWINGS

A more complete appreciation of the present invention and many of the attendant advantages thereof will be readily obtained as the same becomes better understood by reference to the follow detailed description when considered in connection with the accompanying drawings, wherein.

DESCRIPTION OF THE PREFERRED EMBODIMENT

Figure 2:
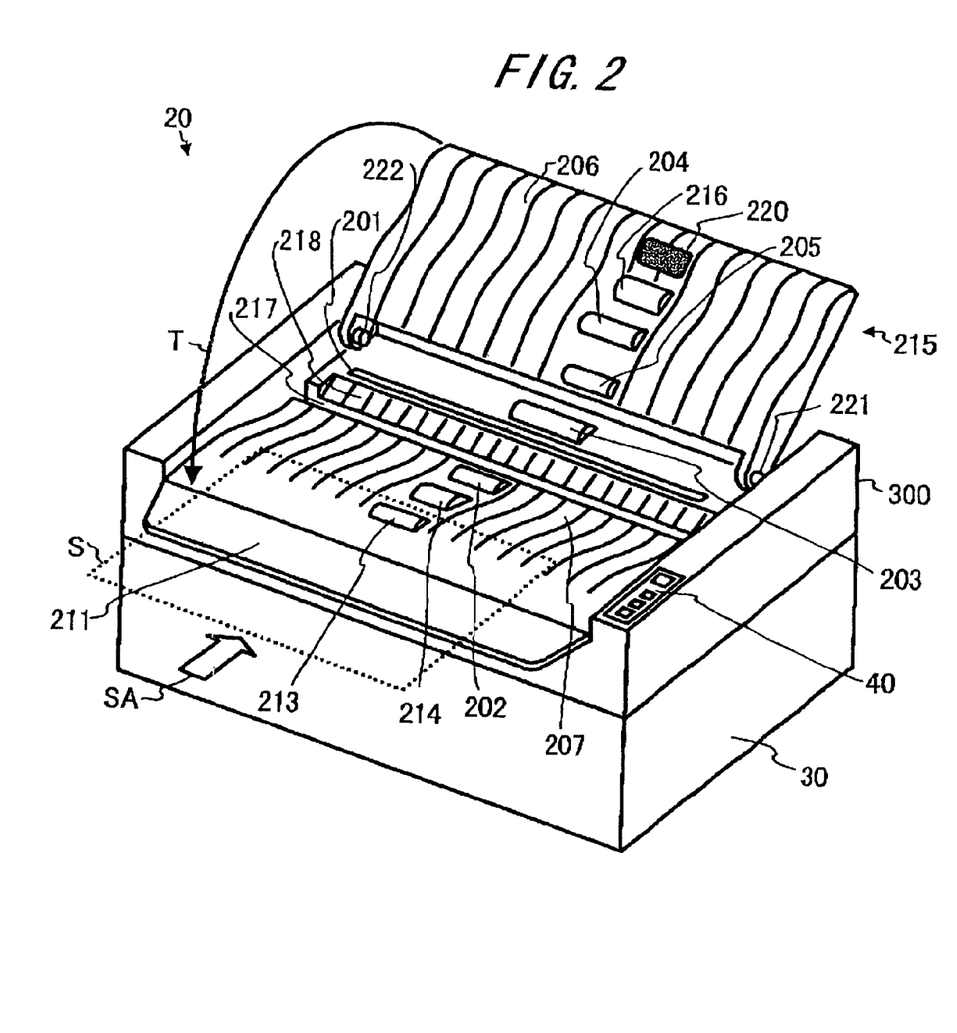
FIG. 2 is a schematic illustration of a facsimile machine configured according to the present invention.

Referring now to the drawings, wherein like reference numerals designate identical or corresponding parts throughout the several views, and more particularly to FIG. 2 thereof, an exterior of a facsimile machine 20 is shown as an example of an image processing system configured according to of the present invention. The facsimile machine 20 includes an image printing apparatus 30, an image reading apparatus 300, and an operation panel 40. The facsimile machine 20 can be also used as a photocopier by pressing a button on the operation panel 40. In this example, the operation panel 40 is embedded in the image reading apparatus 300. The image printing apparatus 30 includes an image forming process cartridge for forming an image on a sheet of paper and a print paper transport mechanism. The image reading apparatus 300 is rotatably mounted on the image printing apparatus 30 at the rear side of the apparatus 30. Thereby, the image reading apparatus 300 can be opened upwardly as necessary, for example, to clear a sheet of paper jammed in the image printing apparatus 30, to supply toner for the image printing apparatus 30, etc.

The image reading apparatus 300 includes an optical image reading device 201, a sheet transport roller 202, a sheet discharge roller 203, a first pinch roller 204, a second pinch roller 205, an upper sheet guide 206, a lower sheet guide 207, an original document tray 211, a pickup roller 213, a sheet feed in roller 214, a sheet separating roller 216, a dirt tap hollow 217, a sheet guide slope 218, a pressing pad 220, and hine pins 221 and 222. The first pinch roller 204, the second pinch roller 205, the sheet separating roller 216, and the pressing pad 220 are mounted on the upper sheet guide 206. A cover module 215 includes the first pinch roller 204, the second pinch roller 205, the upper sheet guide 206, the sheet separating roller 216, and the pressing pad 220.

The cover module 215 is rotatably mounted on the hinge pins 221 and 222 at the rear side of the frame of the image reading apparatus 300. Thus, the cover module 215 can be opened as necessary, as illustrated in FIG. 2. The cover module 215 is normally closed, as indicated by the arrow path T in FIG. 2. When the cover module 215 is closed, the pressing pad 220 contacts the pickup roller 213, the sheet separating roller 216 contacts the sheet feed in roller 214, the first pinch roller 204 contacts-the sheet transport roller 202, and the second pinch roller 205 contacts the sheet discharge roller 203.

The original document tray 211 holds one or more stacks of documents. When a start instruction is input to the operation panel 40, the pickup roller 213 feeds the bottom sheet S of a document into the image reading apparatus 300 along the direction SA. The sheet feed in roller 214 feeds the sheet S toward the sheet transport roller 202. When plural sheets of the documents have been fed into a nip formed between the sheet separating roller 216 and the sheet feed in roller 214, the sheet separate, roller 216 rotates such that only the bottom sheet of the plural sheets of the documents is fed toward the sheet transport roller 202. The sheet separating roller 216 may be replaced by a stationary friction pad made of synthetic rubber or a cork sheet, for example, for blocking all of the sheets except the bottom sheet of the stack of the documents to be fed.

The sheet transport roller 202 transports the sheet S toward the sheet discharge roller 203 through the dirt trap hollow 217, the sheet guide slope 218, and the optical image reading device 201. When the sheet S is transported above the dirt trap hollow 217 and the sheet guide slope 218, dirt Bed on the sheet S can drop down from the sheet S into the dirt trap hollow 217 or onto the sheet guide slope 218, for example, by gravity, vibration, a rubbing motion, etc. When the sheet of document S is transported above the optical image reading device 201, the optical im age reading device 201 reads information cued on the sheet S. After the image reading operation, the sheet discharge roller 203 discharges the sheet S from the image reading apparatus 300.

Figure 3:
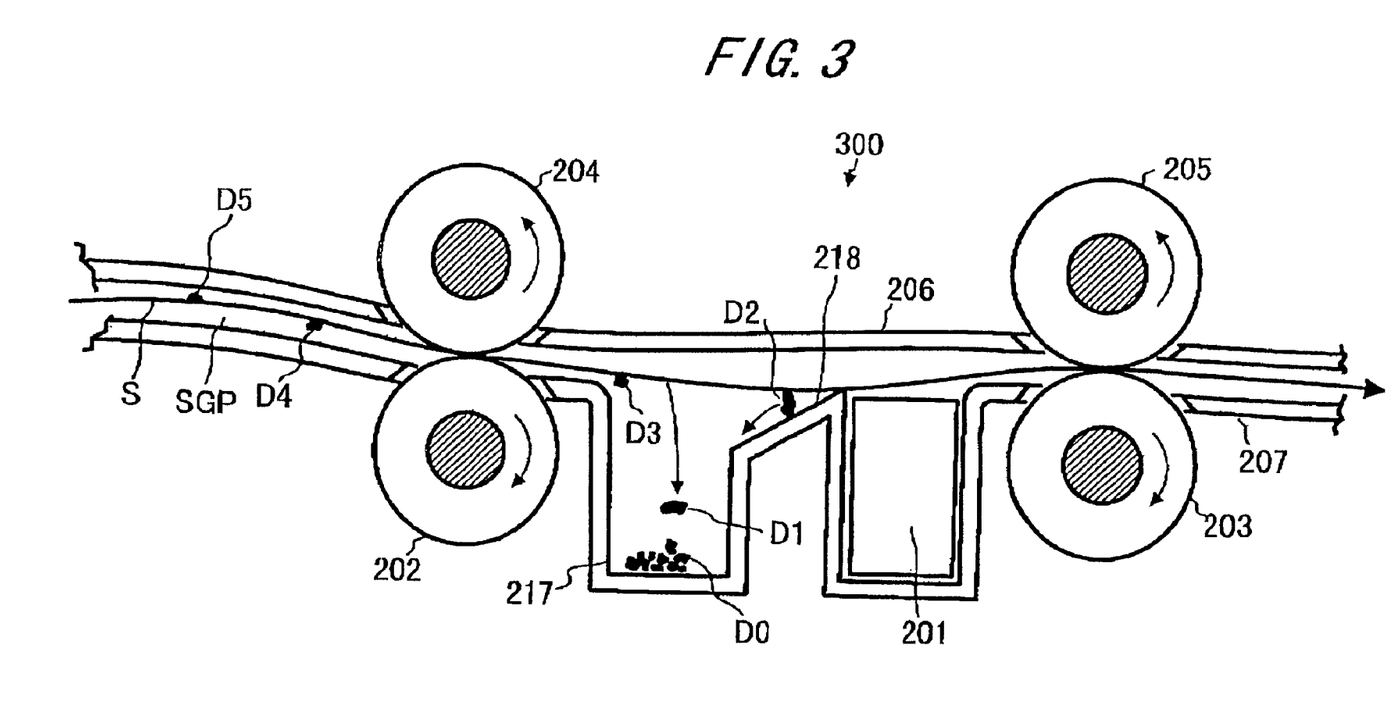
FIG. 3 is a schematic partial sectional view of the facsimile machine of FIG. 2.

FIG. 3 is a schematic partial sectional view illustrating a structure of the image reading apparatus 300 of FIG. 2 when the cover module 215 is closed. Together with the upper sheet guide 206, the lower sheet guide 207 forms a sheet guide path SOP, which is a space between the two sheet guides 206 and 207.

The sheet transport roller 202 and the sheet discharge roller 203 rotate in a clockwise direction. The first pinch roller 204 is pressed toward the sheet transport roller 202 with an appropriate pressure, and the second pinch roller 205 is pressed toward the sheet discharge roller 203 with an appropriate pressure. When no sheet is being fed in, the first pinch roller 204 contacts the sheet transport roller 202, and the second pinch roller 205 contacts the sheet discharge roller 203. As a result, the first and second pinch rollers 204 and 205 are rotated in a counter clockwise direction.

When a sheet S is transported from the sheet feed in roller 214 (FIG. 2) to the left side of the sheet guide path SGP in FIG. 3, the first pinch roller 204 presses the sheet S against the sheet transport roller 202. Likewise, the second pinch roller 205 presses the sheet S against the sheet discharge roller 203. Thus, the sheet transport roller 202 and the sheet discharge roller 203 transport the sheet S from the left side toward the right side in FIG. 3 over the dirt trap hollow 217, the sheet guide slope 218, and the optical image reading device 201.

When the sheet S is transported over the optical image reading device 201, image information carried on a surface facing the optical image reading device 201 is read by the optical image reading device 201. Then, the sheet S is discharged from the image reading apparatus 300 by the sheet discharge roller 203.

As noted above, sheets sometimes carry dirt, for example, paper fibers, particles of pencil lead, eraser particles, ink particles, particles of photocopier toner, lint, etc. FIG. 3 shows particles of dirt D0 trapped in the dirt trap hollow 217.

The particles of dirt have dropped off from sheets that have traveled through the sheet guide path SGP. Particles of dirt D3, 04, and DS are adhered to the sheet S. Particles of dirt D1 and D2 are dropping off of the sheets due to gravity, vibration, a scrubbing motion, etc.

The sheet guide slope 218 functions as a sheet transportation guide. Even when a leading edge of a sheet is downwardly curled or rippled, the sheet guide slope 208 guides and smoothly transports the leading edge of the sheet to the optical image reading device 201. The sheet guide slope 218 also functions as a dirt receiver. That is, when a sheet caries dirt beyond the dirt trap hollow 217, dirt such as the dirt D2 illustrated in FIG. 3, can drop off the sheet nd be received by the sheet guide slope 218. Some of the dirt received and stacked on the sheet guide slope 218 may tumble flier down into the sheet guide slope 218 into the dirt trap hollow 217.

As described above, a certain proportion of dirt carried on a sheet of document is trapped by the dirt trap hollow 217 or the sheet guide slope 218. Therefore, the probability that the optical im age reading device 201 becomes soiled by dirt is decreased. Thus, the optical imago reading device 201 maintains a quality image reading operation of documents for a relatively long time. Further, the sheet guide slope 218 can prevent a sheet of document from entering the dirt trap hollow 217 and guide the sheet to the optical image reading device 201.

Figure 4:
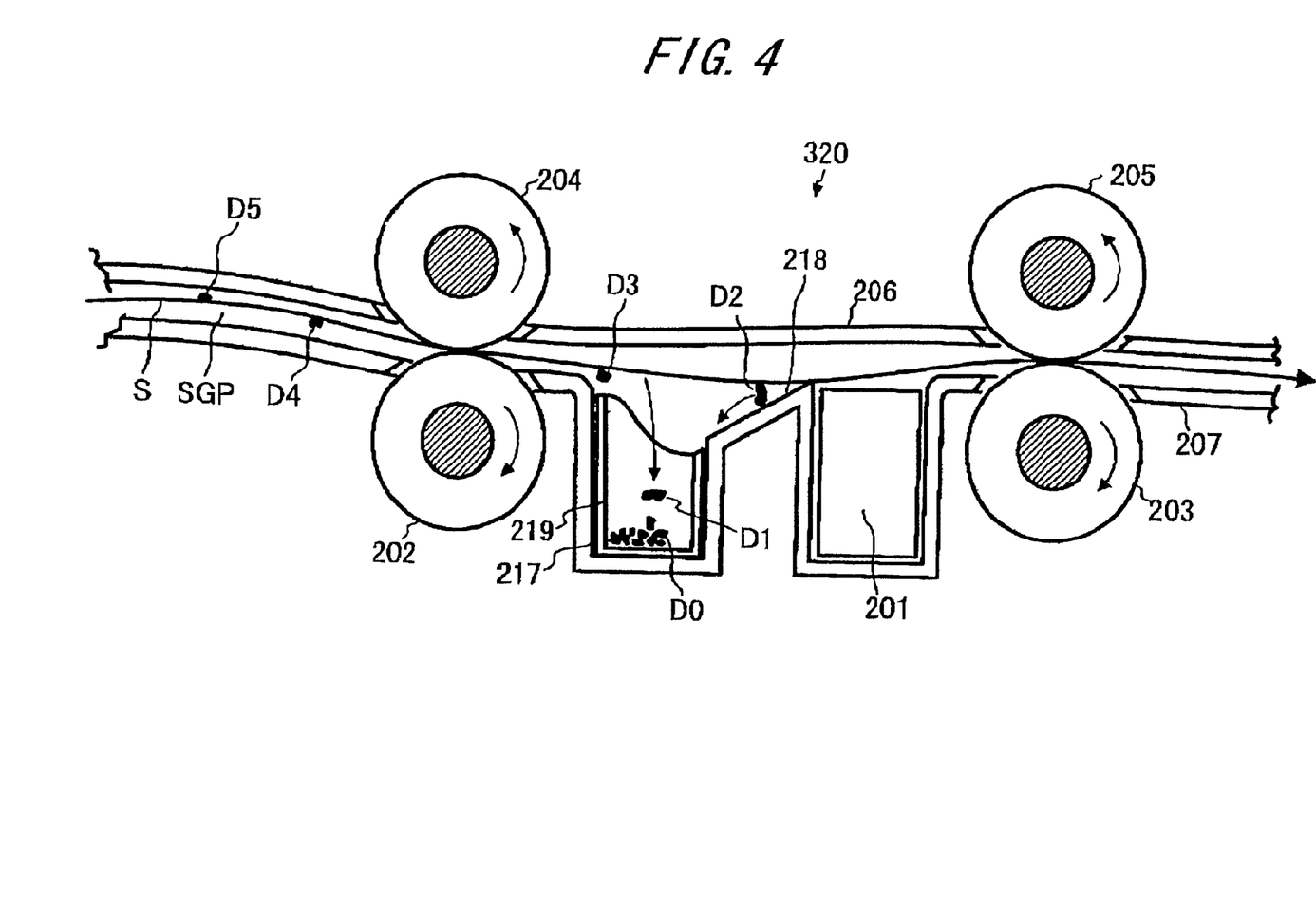
FIG. 4 is a schematic partial sectional view of an image reading apparatus configured according to the present invention.

FIG. 4 is a schematic partial sectional view illustrating a structure of an image reading apparatus 320 according to another example of the present invention. The image reading apparatus 320 includes a removable dirt trap box 219. The removable dirt trap box 219 may be loosely fit into the dirt trap hollow 217 so that the removable dirt trap box 219 can be easily detached from the image reading apparatus 320 and cleaned. The removable dirt trap box 219 can also be attached to the image reading apparatus 320 for reusing.

Figure 5:
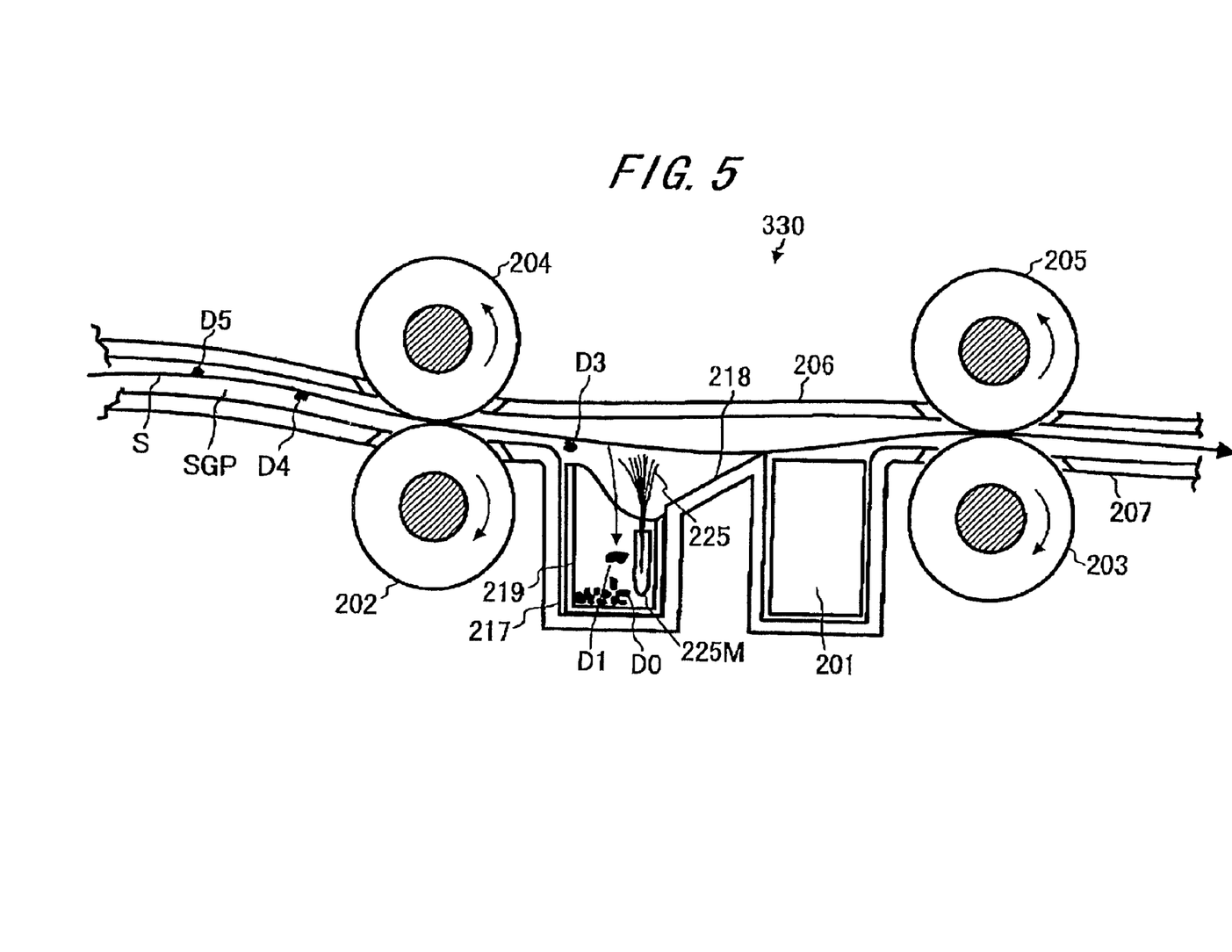
FIG. 5 is a schematic partial sectional view of an image reading apparatus configured according to the present invention.

FIG. 5 is a schematic partial sectional view illustrating a structure of an image reading apparatus 330 according to still another example of the present invention. The image reading apparatus 330 further includes a dirt trap brush 225.

The dirt trap brush 225 may be attached to the removable dirt trap box 219 as illustrated in FIG. 5. When an image reading apparatus does not have a dirt trap box (e.g., the image reading apparatus 300 of FIG. 3), the dirt trap brush 225 may be attached to the dirt trap hollow 217 of FIG. 3. Referring to FIG. 5, the dirt trap brush 225 may be made of electrically conductive fibers, such as steel fibers, carbon fibers, organic conductive fibers, etc. The dirt trap brush 225 may be electrically grounded so that an electrical charge on the sheet of document S and an electrical charge on any dirt adhered to the sheet S can be more easily discharge. In the example of FIG. 5, the dirt trap brush 225 is electrically grounded to a frame of the image reading apparatus 330 via a metal cramp 225M for the dirt trap brush 225.

Figure 6:
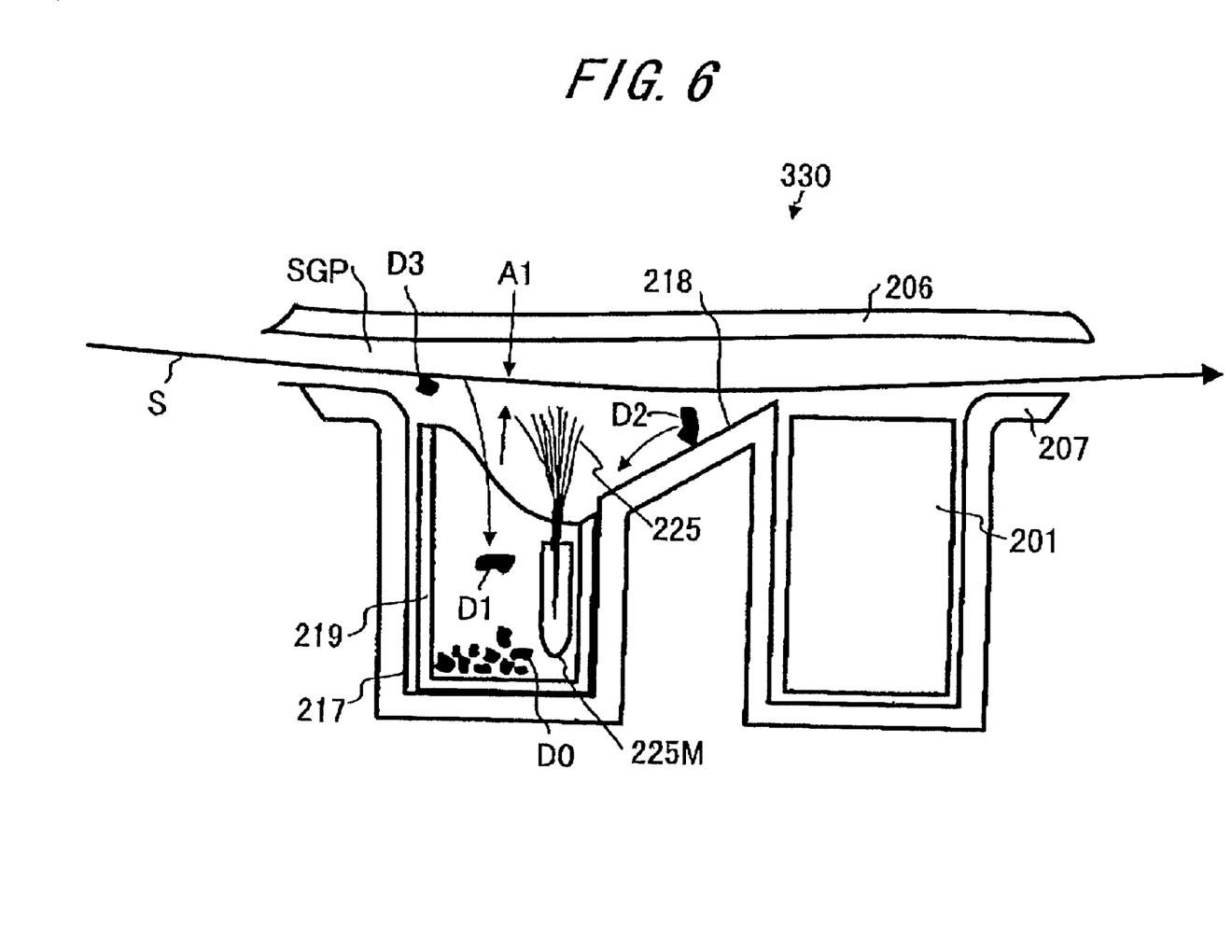
FIG. 6 is an enlarged schematic partial sectional view illustrating the distance between a dirt trap brush and a sheet in the image reading apparatus of FIG. 5.

FIG. 6 is an enlarged schematic partial sectional view illustrating a distance A1 between the dirt trap brush 225 and the sheet S in the image reading apparatus 330 of FIG. 5.

A suitable distance A1 between the dirt trap brush 225 and the sheet S can be determined and adjusted based on the effectiveness of the electrical discharging action and the smoothness with which sheets are transported. Generally, when the dirt trap brush 225 is soft, the distance A1 between the dirt trap brush 225 and the sheet S can be made smaller than when the dirt trap brush 225 is stiff.

Figure 7:
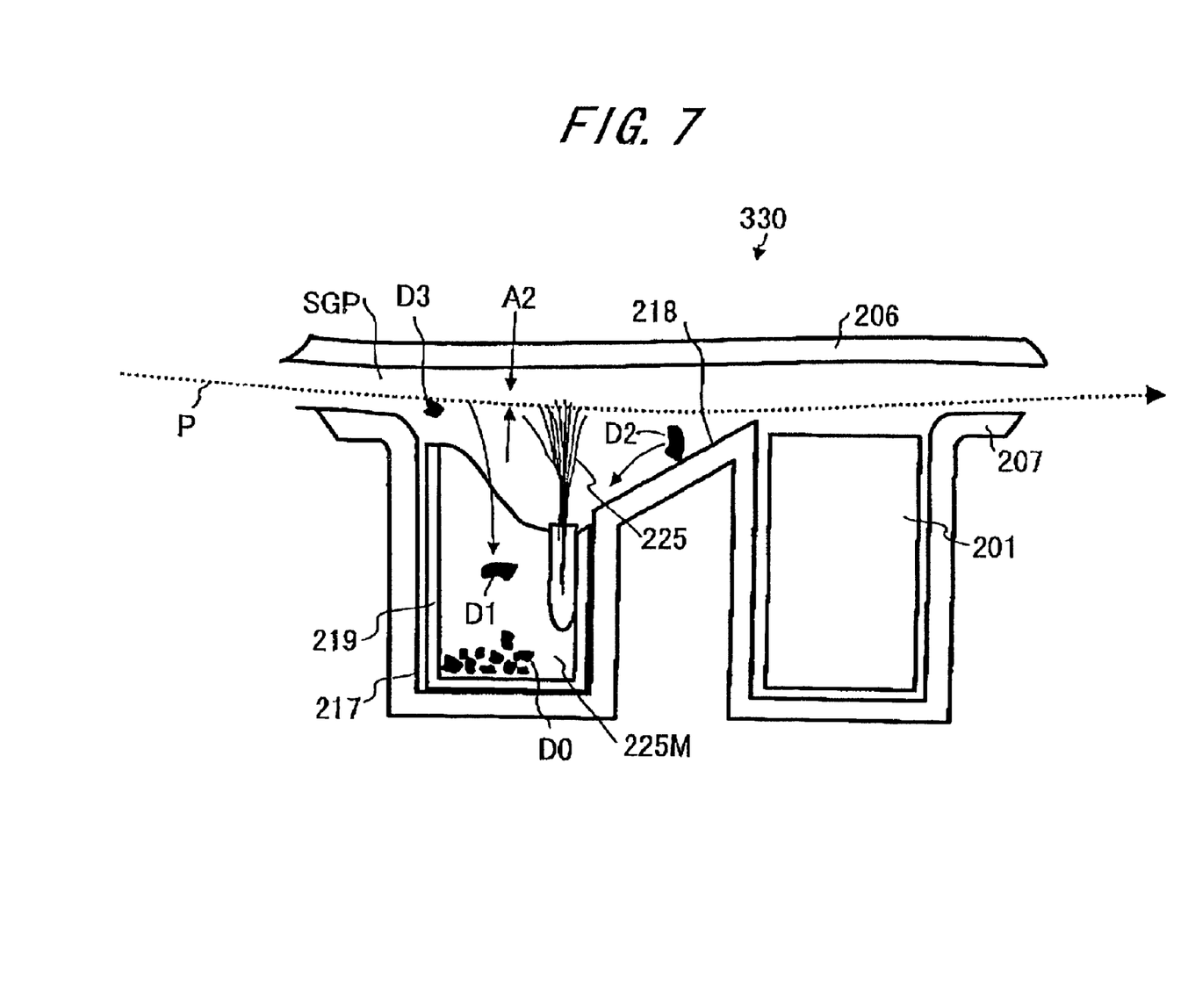
FIG. 7 is an enlarged schematic partial sectional view illustrating the distance between the dirt trap brush and the sheet in the image reading apparatus of FIG. 5.

In addition, when the dirt trap brush 225 is sofa the dirt trap brush 225 may contact the sheet S. FIG. 7 is an enlarged schematic partial sectional view illustrating a distance A2 between the dirt trap brush 225 and the path P of a sheet in the image reading apparatus 330 of FIG. 5. In this example, the tip of the dirt trap bush 225 is placed above a level where the sheet passes, and thus, the tip of the dirt trap brush 225 contacts the sheet S and flutters while the sheet S is transported. When the dirt trap brush 225 contacts a sheet of a document, dirt on the sheet is more effectively trapped because of the dual sheet of physical wiping and electrical discharging actions of the dirt trap brush 225. Alternatively, the dirt trap brush 225 is not electrically conductive.

In the example of figure 7, dirt carried on a sheet is effectively trapped. Therefore, the probability that tae optical image reading device 201 becomes soiled by dirt is further decreased. Additionally, when the dirt trap brush 225 is not electrically conductive, production costs are decreased.

Figure 8:
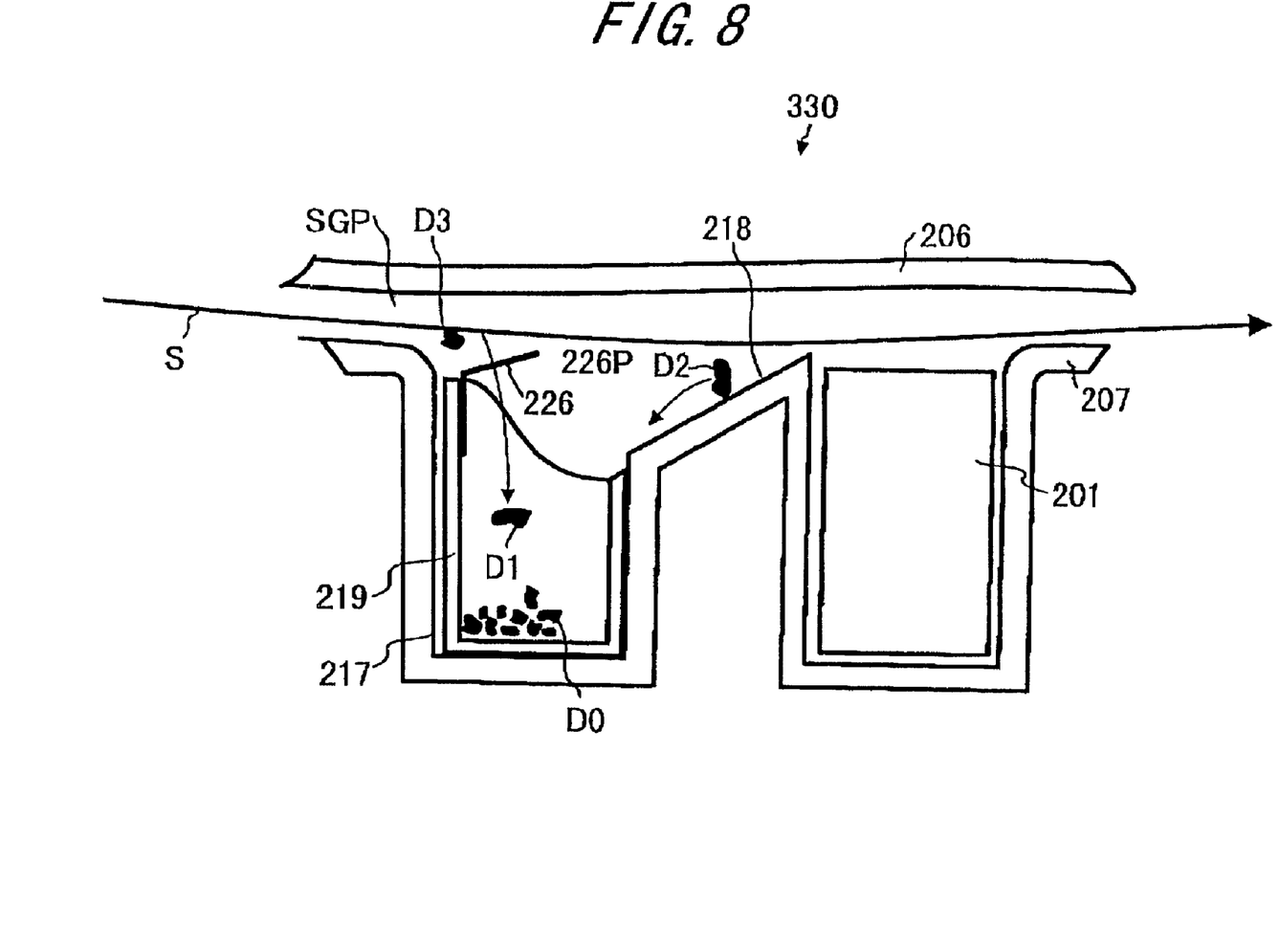
FIG. 8 is a schematic partial sectional view of an image reading apparatus configured according to the present invention.

The dirt trap brush 225 can be replaced by other types of discharging devices FIG. 8 is a schematic partial sectional view illustrating an image reading apparatus 330 according to another example of the present invention. With reference to FIG. 8, the image reading apparatus 330 provides a discharging device 226 having a plurality of nail-like or needle-like tips 226P facing the sheet S.

Figure 9:
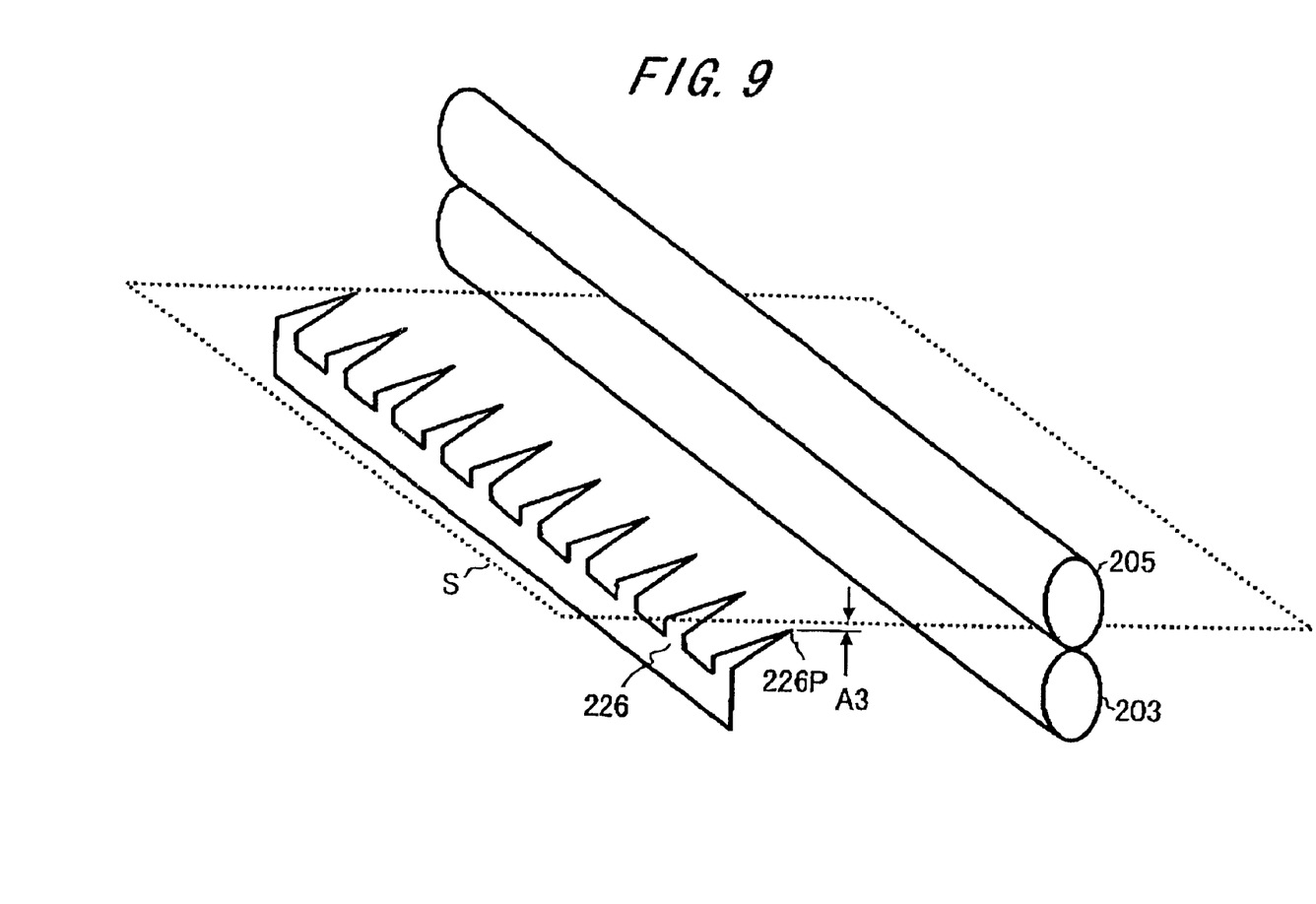
FIG. 9 is a schematic view of a discharging device.

FIG. 9 is a schematic projective view illustrating the discharging device 226. The discharged device 226 is electrically conductive and preferably electrically grounded. Each tip 226P of the discharging device 226 is preferably sharp enough to make the electric field in the vicinity of the tips 226P strong enough and concentrated enough to cause an electrical discharge between the discharging device 226 and the sheet S or between the discharging device 226 and dirt on the sheet S. A distance A3 between a tip 226P of the discharging device 226 and a sheet S. The distance A3 between the discharging device 226 and the sheet S can be properly determined based on an effectiveness of the electrical discharge action and the smoothness of the transportation of the sheet S. The discharging device 226 can be made of a metal sheet or conductive plastic materials, for example.

In this example, the discharging device 226 having tips 226P may be more durable than brush fibers. Further, a cleaning operation may be performed more easily with the discharging device 226 than with brush fibers.

Figure 10:
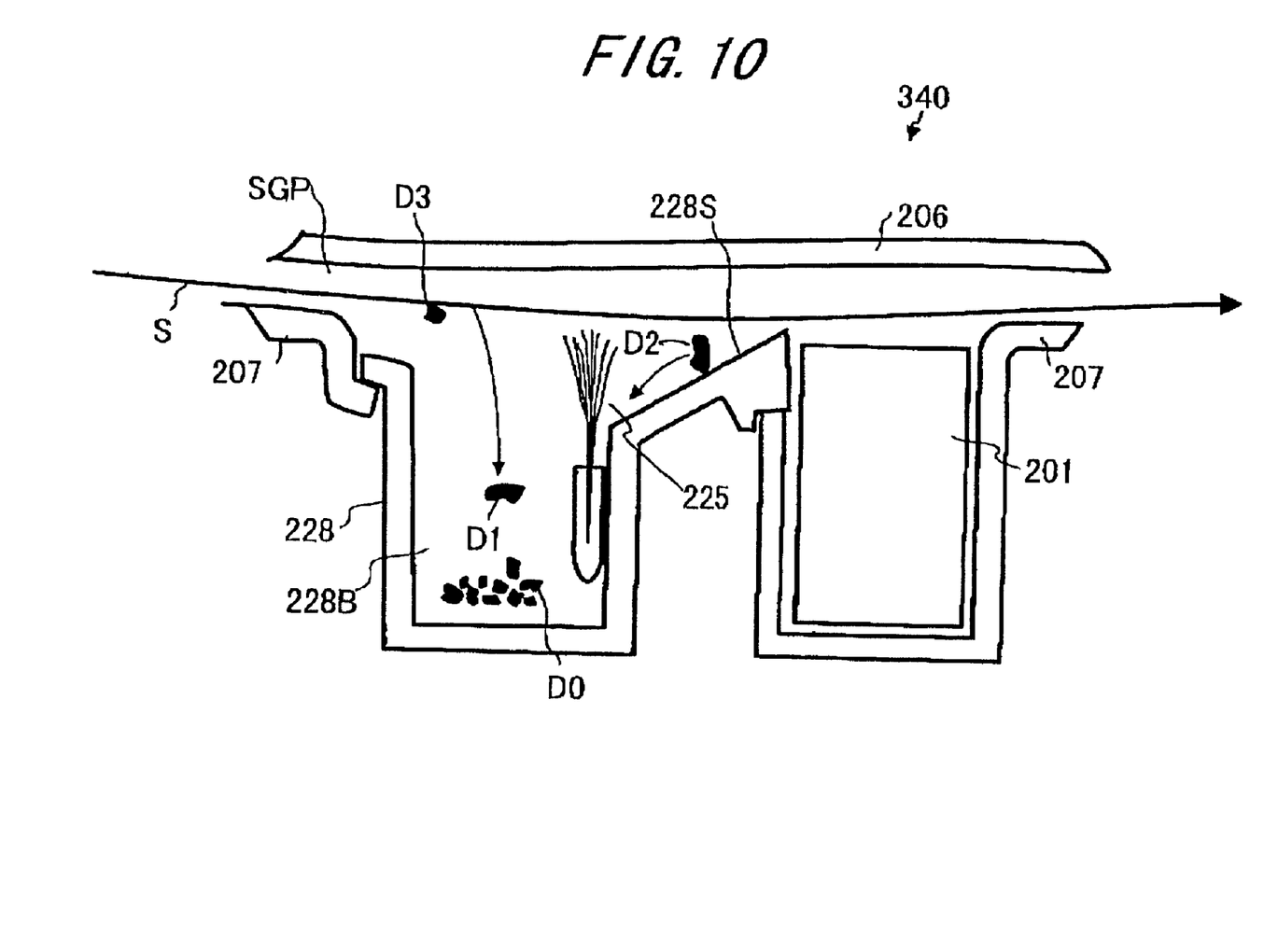
FIG. 10 is a schematic partial sectional view of an image reading apparatus configured according to the present invention.

FIG. 10 is a schematic partial sectional view illustrating a structure of an image reading apparatus 340 according to a still further example of the present invention. The image reading apparatus 340 includes a removable dirt trap module 228 that has a dirt trap box portion 228B and a sheet guide slope portion 228S. Further, a dirt trap brush 225 can be mounted on the removable dirt trap module 228.

In this example, the removable dirt trap module 228, including the dirt trap brush 225, is loosely fit in a hole in the lower sheet guide 207. With the removable dirt trap module 228, the dirt trp box 228B, the sheet guide 228S, and the dirt trap brush 225 can perform a cleaning operation more easily.

As described above, the novel image reading apparatus of the present invention can decrease the degree to which the image reading portion of the apparatus accumulates dirt.

Further, the novel image reading apparatus of the present invention can perform stable image reading operations for a relatively long time.

Obviously, numerous modifications and variations of the preset invention are possible in light of the above teachings. For example, features described for certain embodiments may be combined with other embodiments described herein. It is therefore to be understood that within the scope of the appended claims, the invention may be practiced otherwise than as specifically described herein.

This document is based on Japanese patent application No. 11 006486 filed in the Japanese Patent Office on Jan. 13, 1999, the entire contents of which are incorporated by reference herein.

What is claimed as new and is desired to be secured by letters patents of the united states:

1. An image reading apparatus for reading an image on a sheet, comprising:
   a sheet transporting device configured to transport the sheet along a sheet guide path;
   an image reading device configured to optically read the image on the sheet;
   a dirt trapping device comprising a dirt trap hollow configured to trap dirt carried on the sheet and a dirt trap box disposed in and separate from the dirt trap hollow, the dirt trapping device being positioned upstream from the image reading device relative to a direction in which the sheet is transported by the sheet transporting device; and
   a dirt guide member configured to guide dirt from a position in the image reading apparatus between the image reading device and the dirt trapping device to the dirt trapping device, the dirt guide member comprising a sloped surface having a first end disposed adjacent the image reading device and a second end disposed at a lower elevation adjacent the dirt trapping device, the sloping surface configured to guide the dirt from adjacent the image reading device to the dirt trapping device.

2. An image reading apparatus according to claim 1, wherein the dirt trap hollow is configured to receive dirt that falls from the sheet.

3. An image reading apparatus according to claim 2, wherein the dirt guide member comprises a sheet guide slope disposed between the dirt trap hollow and the image reading device along the sheet guide path.

4. An image reading apparatus according to claim 1, wherein the dirt guide member comprises a sheet guide slope disposed between the dirt trap hollow and the image reading device along the sheet guide path, the sheet guide slope being configured to guide the sheet.

5. An image reading apparatus according to claim 1, wherein the dirt trapping device further comprises a dirt trap brush configured to cause dirt to drop off of the sheet.

6. An image reading apparatus according to claim 5, wherein the dirt trap brush is configured to discharge at least one of: an electric charge on the sheet and an electric charge on the dirt carried on the sheet.

7. An image reading apparatus according to claim 5, wherein the dirt trap brush is configured to contact the sheet when the sheet transporting device transports the sheet along the sheet guide path.

8. An image reading apparatus according to claim 5, wherein the dirt trap brush is configured to be apart from the sheet when the sheet transporting device transports the sheet along the sheet guide path.

9. An image reading apparatus according to claim 1, wherein the dirt trapping device further comprises an electric discharging device configured to discharge at least one of: an electric charge on the sheet and an electric charge on the dirt carried on the sheet.

10. An image reading apparatus according to claim 9, wherein the electric discharging device is electrically grounded.

11. An image reading apparatus for reading an image on a sheet, comprising:
    a sheet transporting device configured to transport the sheet along a sheet guide path;
    an image reading device configured to optically read the image on the sheet;
    a dirt trapping device comprising a dirt trap hollow configured to trap dirt carried on the sheet, the dirt trapping device being positioned upstream from the image reading device relative to a direction in which the sheet is transported by the sheet transporting device; and
    a dirt guide member configured to guide dirt from a position in the image reading apparatus between the image reading device and the dirt trapping device to the dirt trapping device, the dirt guide member comprising a sloped surface having a first end disposed adjacent the image reading device and a second end disposed at a lower elevation adjacent the dirt trapping device, the sloping surface configured to guide the dirt from adjacent the image reading device to the dirt trapping device,
    wherein the dirt trapping device further comprises a removable dirt trap box disposed in the dirt trap hollow and configured to receive dirt that falls from the sheet.

12. An image reading apparatus comprising:
    a sheet transporting device configured to transport the sheet along a sheet guide path;
    an image reading device configured to optically read the image on the sheet; and
    a dirt trapping device comprising a dirt trap hollow configured to trap dirt carried on the sheet, the dirt trapping device being positioned upstream from the image reading device relative to a direction in which the sheet is transported by the sheet transporting device; and
    a sheet guide slope disposed between the removable dirt trap box and the optical reading device along the sheet guide path,
    wherein the dirt trapping device further comprises a removable dirt trap box disposed in the dirt trap hollow and configured to receive dirt that falls from the sheet.

13. An image processing system for reading an image on a sheet, comprising:
    an image printing apparatus; and
    an image reading apparatus including:
       a sheet guide path;
       a sheet transporting device configured to transport the sheet along the sheet guide path;
       an image reading device configured to optically read the image on the sheet;
       a dirt trapping device comprising a dirt trap hollow configured to trap dirt carried on the sheet and a dirt trap box disposed in and separate from the dirt trap hollow, the dirt trapping device being positioned upstream from the image reading device relative to a direction in which the sheet is transported by the sheet transporting device; and
       a dirt guide member configured to guide dirt from a position in the image reading apparatus between the image reading device and the dirt trapping device to the dirt trapping device, the dirt guide member comprising a sloped surface having a first end disposed adjacent the image reading device and a second end disposed at a lower elevation adjacent the dirt trapping device, the sloping surface configured to guide the dirt from adjacent the image reading device to the dirt trapping device.

14. An image processing system according to claim 13, further comprising at least one of a facsimile machine, a photocopier machine, and an image filing machine.

15. An image reading apparatus for reading an image on a sheet, the image reading apparatus comprising:

means for transporting the sheet along a sheet guide path;

means for optically reading the image on the sheet;

means for trapping dirt carried on the sheet, the means for trapping dirt being positioned upstream from the means for optically reading relative to a direction in which the sheet is transported by the means for transporting, wherein the means for trapping dirt comprises a dirt trap hollow and a dirt trap box disposed in and separate from the dirt trap hollow; and means for guiding dirt from a position in the image reading apparatus between the means for optically reading the image and the means for trapping dirt to the means for trapping dirt, the means for guiding dirt comprising a sloped surface having a first end disposed adjacent the means for optically reading and a second end disposed at a lower elevation adjacent the means for trapping dirt, the sloping surface configured to guide the dirt from adjacent the means for optically reading to the means for trapping dirt.

16. An image reading apparatus according to claim 15, wherein the dirt trap hollow is configured to receive dirt that drops from the sheet.

17. An image reading apparatus according to claim 16, wherein the means for guiding dirt comprises a sheet guide slope disposed between the dirt trap hollow and the means for optically reading along the sheet guide path.

18. An image reading apparatus according to claim 15, wherein the means for guiding dirt comprises a sheet guide slope for guiding the sheet, the sheet guide slope being disposed between the dirt trap hollow and the means for optically reading along the sheet guide path.

19. An image reading apparatus according to claim 15, wherein the means for trapping dirt further comprises a dirt trap brush for causing dirt to fall from the sheet.

20. An image reading apparatus according to claim 19, wherein the dirt trap brush discharges at least one of: an electric charge on the sheet and an electric charge on the dirt carried on the sheet.

21. An image reading apparatus according to claim 19, wherein the dirt trap brush is configured to contact the sheet when the means for transporting transports the sheet along the sheet guide path.

22. An image reading apparatus according to claim 19, wherein the dirt trap brush is configured to be apart from the sheet when the means for transporting transports the sheet along the sheet guide path.

23. An image reading apparatus according to claim 15, wherein the means for trapping dirt further comprises an electric discharging means for discharging at least one of: an electric charge on the sheet and an electric charge on the dirt carried on the sheet.

24. An image reading apparatus according to claim 23, wherein the electric discharging means is electrically grounded.

25. An image reading apparatus for reading an image on a sheet, the image reading apparatus comprising:

means for transporting the sheet along a sheet guide path;

means for optically reading the image on the sheet;

means for trapping dirt carried on the sheet, the means for trapping dirt being positioned upstream from the means for optically reading relative to a direction in which the sheet is transported by the means for transporting, wherein the means for trapping dirt comprises a dirt trap hollow, wherein the means for trapping dirt further comprises a removable dirt trap box disposed in the dirt trap hollow for receiving dirt that falls from the sheet; and means for guiding dirt from a position in the image reading apparatus between the means for optically reading the image and the means for trapping dirt to the means for trapping dirt, the means for guiding dirt comprising a sloped surface having a first end disposed adjacent the means for optically reading and a second end disposed at a lower elevation adjacent the means for trapping dirt, the sloping surface configured to guide the dirt from adjacent the means for optically reading to the means for trapping dirt.

26. An image reading apparatus comprising:

means for transporting the sheet along a sheet guide path;

means for optically reading the image on the sheet;

means for trapping dirt carried on the sheet, the means for trapping dirt being positioned upstream from the means for optically reading relative to a direction in which the sheet is transported by the means for transporting, wherein the means for trapping dirt comprises a dirt trap hollow, wherein the means for trapping dirt further comprises a removable dirt trap box disposed in the dirt trap hollow for receiving dirt that falls from the sheet; and a sheet guide slope disposed between the removable dirt trap box and the means for optically reading along the sheet guide path.

27. An image processing system comprising:

an image printing apparatus; and an image reading apparatus including;

means for transporting a sheet along a sheet guide path;

means for optically reading an image on the sheet;

means for trapping dirt carried on the sheet, the means for trapping dirt being positioned upstream from the means for optically reading relative to a direction in which the sheet is transported by the means for transporting, wherein the means for trapping dirt comprises a dirt trap hollow and a dirt trap box disposed in and separate from the dirt trap hollow; and means for guiding dirt from a position in the image reading apparatus between the means for optically reading the image and the means for trapping dirt to the means for trapping dirt, the means for guiding dirt comprising a sloped surface having a first end disposed adjacent the means for optically reading and a second end disposed at a lower elevation adjacent the means for trapping dirt, the sloping surface configured to guide the dirt from adjacent the means for optically reading to the means for trapping dirt.

28. An image processing system according to claim 27, further comprising:

at least one of a facsimile machine, a photocopier machine, and an image filing machine.

* * * * *